United States Patent [19]

Schure et al.

[11] 4,189,743
[45] Feb. 19, 1980

[54] APPARATUS AND METHOD FOR AUTOMATIC COLORATION AND/OR SHADING OF IMAGES

[75] Inventors: Alexander Schure, Old Westbury; Edwin Catmull, Glen Cove; Alvy R. Smith, Brookville, all of N.Y.

[73] Assignee: New York Institute of Technology, Old Westbury, N.Y.

[21] Appl. No.: 752,114

[22] Filed: Dec. 20, 1976

[51] Int. Cl.$^2$ ............................................. H04N 7/18
[52] U.S. Cl. .......................................... 358/93; 358/4; 358/75; 358/80; 358/127; 358/903; 340/701; 340/707; 340/711; 340/725; 340/747; 340/798; 340/799
[58] Field of Search ................. 358/93, 127, 283, 75, 358/76, 81, 80, 903; 340/324 A, 324 AD, 172.5

[56] References Cited

U.S. PATENT DOCUMENTS 3,811,113  12/1972  Saito, et al. ......................... 340/324
3,934,083  1/1976  Plath ..................................... 358/78

OTHER PUBLICATIONS

Alan Kitching "Computer Animation —— Some New Antics", British Kinematography Sound and TV 12-73.
Brunel "Towards A Computer Animating Production Tool", Proceedings of Eurocomp Conference, UK 5-74.
W. J. Kubitz and W. J. Poppelbaum," The Tricolorcartograph", Nov./Dec. 1969, pp. 76-79, Infor. Display.
Hughes Aircraft Co. "Hughes Model 639 Scan Conversion Memory" 3-11-74.

*Primary Examiner*—Robert L. Griffin
*Assistant Examiner*—Edward L. Coles
*Attorney, Agent, or Firm*—Martin Novack

[57] ABSTRACT

The invention is an improved apparatus and method for the automatic coloration and/or shading of images, and especially images utilized for presenting animated motion pictures. Display means are provided, preferably at least one display for displaying monochrome line drawings and one for displaying color images. Graphical imput means, for example a data tablet, are provided, having a coordinate system adapted to effect display on the display means of characters defined by coordinate points selected by an operator. Means are provided for storing the coordinate points of at least one enclosed area of the coordinate system, this storing means typically including a portion of the data base of a computer system which stores the coordinate points of the lines drawn by the operator. These lines typically define a plurality of enclosed areas, such as the areas of a drawn character or figure. Means are also provided for storing an operator-selected position reference, called a "seed point", for each enclosed area. Further means are provided for storing an operator-selected color-defining parameter associated with each of the seed points. In this manner, the operator defines the coloration of each area, the seed point defining the area to be colored and the color-defining parameter associated with the seed point being determinative of the color with which the area will be filled. Means are provided for scanning the coordinate points within each enclosed area, the scan for each area initiating from a position which depends upon the stored position references, i.e. the stored seed points. Finally, video frame storage means are provided for storing the selected color-defining and/or shading-defining parameter for each of the scanned coordinate points within each enclosed area. In this manner, the video frame storage means will store the operator-selected parameter for each enclosed area, this operation being performed automatically after selection of the area and the desired color.

12 Claims, 18 Drawing Figures

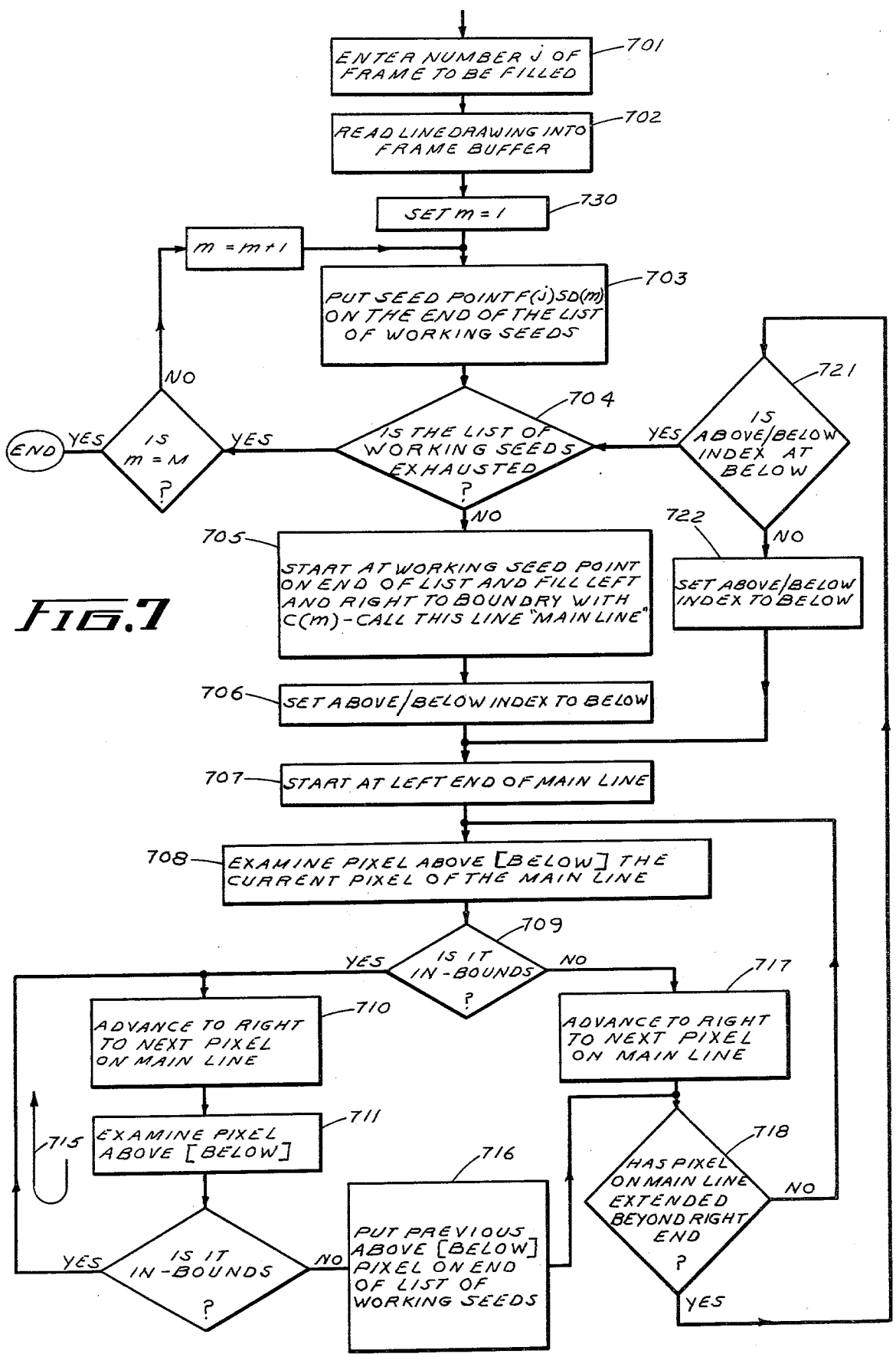

APPARATUS AND METHOD FOR AUTOMATIC COLORATION AND/OR SHADING OF IMAGES

BACKGROUND OF THE INVENTION

This invention relates to the field of the automatic generation of animation and, more particularly, to an apparatus and method for the automatic generation and coloration and/or shading of images.

Animated films are in widespread use for educational and entertainment purposes. Animated films of reasonably high quality have traditionally been very expensive to make. The initial creative work includes generation of a basic story, a sound track, and basic character designs. Typically, a schedule is generated which describes the movements and timings of each scene to be produced, and layout sketches and "key" drawings are made which define the overall design of each scene. It has been generally observed that at this point most of the creative design work has already been done. The so-called "key" drawings or frames are still frames which show extremes of action. In the traditional animation procedure, people known as "in-betweeners" are employed to sketch frames which fill in the action between key frames. After in-betweens are sketched by hand, the hand-drawn pictures are typically transferred onto celluloid-acetate sheets and are then painted in by hand to obtain the desired image coloration. Much labor is involved in obtaining the in-betweens, which typically comprise the majority of frames of the final work product, and in generating the colored "cels". These tasks render the production of animated films are extremely expensive proposition. An advantage of the traditional animation process, however, is that the animator has virtually complete artistic freedom and control over the resulting film; i.e. anything that is drawn can be made to move in a desired fashion and colors can be precisely selected.

A number of approaches have been proposed for employing electronic equipment to assist in the animation process. For example, some early approaches employed electronic graphical inputs, such as data tablet inputs, to allow an animator to freehand draw sketches which were electronically displayed on a cathode ray tube. The displayed figures can be photographed to obtain basic character outlines to work from in generating the animation as described above. More advanced techniques have employed relatively large scale computer systems to assist the animator and minimize labor. For example, one approach has been to design elaborate special purpose computer systems which can perform coordinate transformations that simulate motion of drawn figures. Techniques of this type are disclosed, for example, in the U.S. Pat. Nos. 3,364,382; 3,662,374; 3,689,917; 3,700,792; 3,710,011; 3,723,803 and 3,747,087. It has also been proposed that a relatively large scale digital computer could be employed to aid the animator, e.g., by automatically generating in-between frames by interpolation of lines appearing in successive key frames. A technique of this type is described, for example, in an article entitled "Towards a Computer Animating Production Tool" by N. Burtnyk and M. Wein which appeared in the proceedings of Eurocomp Conference, Brunel—United Kingdom, May 1974. Also of possible interest are the U.S. Pat. Nos. 3,637,997; 3,665,408; 3,835,245 and 3,944,997.

In general, the described techniques, while potentially easing an animator's labors in various ways, do not adequately provide for the animator's needs in the domain of shading and/or coloring of images. Typically, individual frames, whether key frames or in-between frames obtained by interpolation or by coordinate transformation, have their individual areas colored after they are formulated. Substantial effort is needed to effect coloring of the individual areas of each frame, e.g. by selecting the appropriate primary color components for each area to be colored on each frame and superimposing these components. A somewhat different approach is described in an article entitled "Computer Animation—Some New ANTICS", by Alan Kitching, which appeared in British Kinematography Sound and Television, December 1973. In the ANTICS system, closed polygons representing the outline of the area of a given color are input to a system, such as by using a data tablet. The individual colors which comprise a frame are treated separately and drawn on a data tablet, typically working off-line from a pre-drawn sketch. The frames of an action are "built up" using color components with the final frames being obtained as an accumulation of the figure portions of each color. This technique allows a degree of automation of the coloration procedure, but has the drawback that each figure must be drawn using a somewhat redundant compilation of figure portions which are of a common color component. Typically, it is necessary to do this working from sketches which are predrawn off-line and this can be somewhat wasteful of time as well as limiting on color selection while working.

It is an object of the present invention to provide an apparatus and method for the automatic coloration and/or shading of images which overcomes the problems of the prior art as set forth.

SUMMARY OF THE INVENTION

The present invention is directed to an improved apparatus and method for the automatic coloration and/or shading of images, and especially images utilized for presenting animated motion pictures. In accordance with the invention, there are provided display means, for example one or more cathode ray displays, preferably at least one for displaying monochrome line drawings and one for displaying color images. Graphical input means are provided, having a coordinate system adapted to effect display on the display means of characters defined by coordinate points selected by an operator. Typically, although not necessarily, the graphical input means is a data tablet upon which an operator sketches characters in the form of line drawings. In such case, the points of each line may be the previously referenced operator-selected coordinate points. Means are provided for storing the coordinate points of at least one enclosed area of the coordinate system, this storing means typically including a portion of the data base of a computer system which stores the coordinate points of the lines drawn by the operator. These lines typically define a plurality of enclosed areas, such as the areas of a drawn character or figure. Means are also provided for storing an operator-selected position reference, called a "seed point", for each enclosed area. Further means are provided for storing an operator-selected color-defining and/or shading-defining parameter (hereinafter sometimes collectively referred to as a video content parameter) associated with each of the seed points. In this manner, the operator defines the coloration and/or shading of each area, the seed point defining the area to be colored and the color-defining and/or shading-defining parameter associated with the seed point being determinative of the color and/or shading with which the area will be filled. Means are provided for scanning the coordinate points within each enclosed area, the scan for each area initiating from a position which depends upon the stored position references, i.e. the stored seed points. Finally, video frame storage means are provided for storing the selected color-defining and/or shading-defining parameter for each of the scanned coordinate points within each enclosed area. In this manner, the video frame storage means, which in the present embodiment is a unit known as a "digital frame buffer", will store the operator-selected parameter for each enclosed area, this operation being performed automatically after selection of the area and the desired color and/or shading.

In the preferred embodiment of the invention, bulk video storage means, for example a video tape recording subsystem, is provided for storing the contents of the video frame storage means, and after each colored frame is formed, it is stored on video tape. In this embodiment, means are also provided for automatically generating and storing a plurality of frames wherein said at least one enclosed area assumes a different relative location and/or shape in the coordinate system; i.e., a means for generating so-called "in-between" frames. Means are provided for automatically modifying each of the seed points in accordance with its associated enclosed area, so that each area of each in-between frame maintains a seed point within itself. In this embodiment, means are provided for scanning, for each frame, the coordinate points within each enclosed area, the scan for each area initiating from a position which depends upon the modified seed points. In this manner, the frame buffer stores the selected color-defining parameter for each of the scanned coordinate points within each enclosed area of each frame.

Further features and advantages of the invention will become more readily apparent from the following detailed description when taken in conjunction with the accompanying drawings.

BRIEF DESCRIPTION OF THE DRAWINGS

FIG. 7 is a flow diagram suitable for implementing the coloration filling, as generally represented by the block 700 of FIG. 2.

DESCRIPTION OF THE PREFERRED EMBODIMENT

Figure 1:
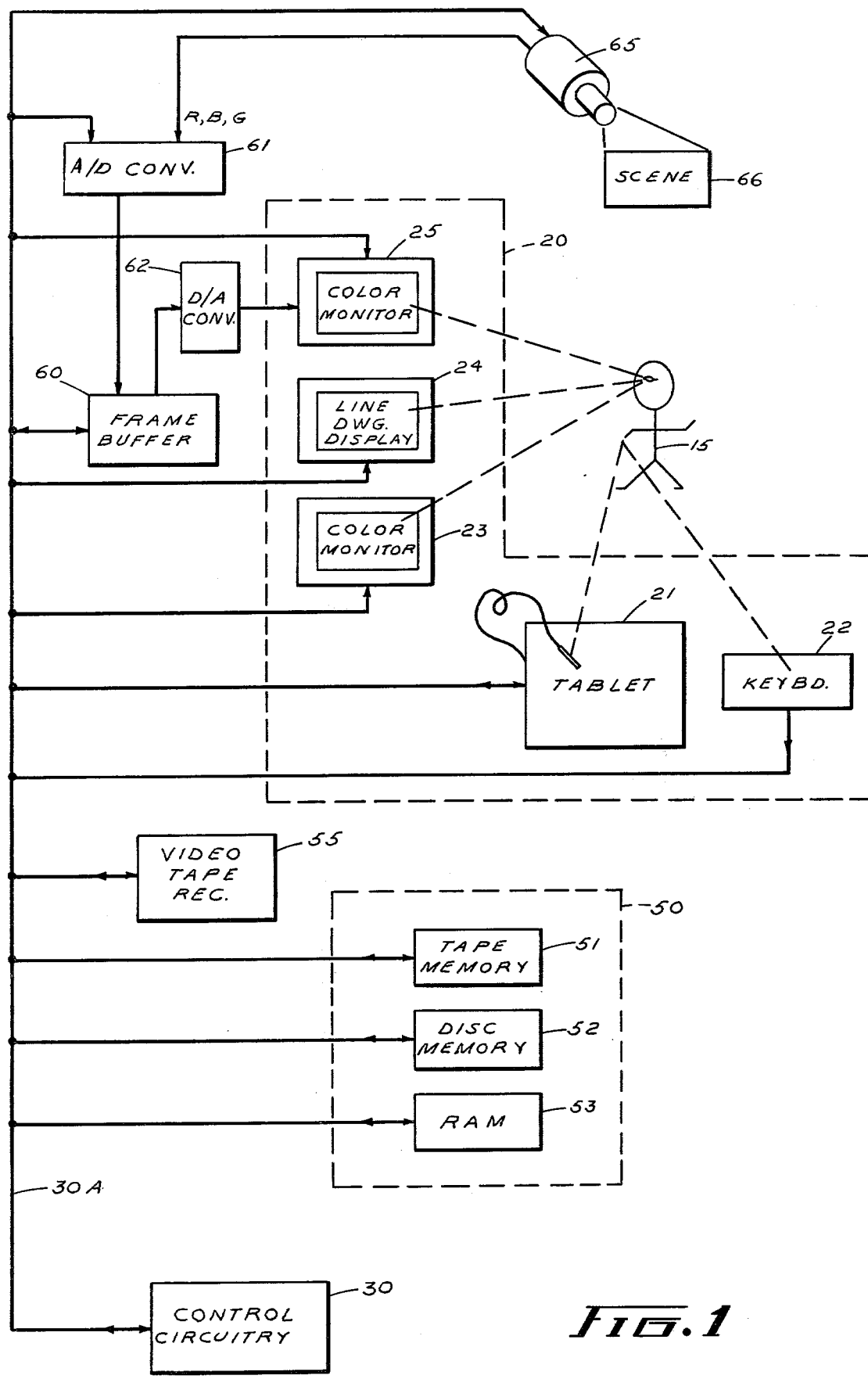
FIG. 1 is a block diagram of an apparatus in accordance with an embodiment of the invention.

Referring to FIG. 1, there is shown a block diagram of an apparatus 10 in accordance with an embodiment of the invention. An operator 15, who is typically, but not necessarily, an animator of some artistic ability, works at a console which includes the devices illustrated within the dashed enclosure 20. In the present embodiment, the console includes two input devices whereby the animator can input information to the apparatus 10, viz. a data tablet 21 and a keyboard 22, and three monitors on which information is displayed, viz. monochrome displays 23 and 24 and color display 25. The data tablet 21 may, for example, be of the type made and sold by Summagraphics Corp. of Fairfield, Conn. which comes equipped with a data pen and operates to generate digital signals that correspond to the instantaneous position of the data pen as it is moved by the operator. The monochrome and color displays may be of the standard cathode ray tube type. The devices in the console 20 are coupled via a bus 30A to control circuitry 30. In the present embodiment the functions of control circuitry 30 are implemented by an appropriately programmed general purpose digital computer, for example the model PDP-11 manufactured by Digital Equipment Corp. of Maynard, Massachusetts. However, it will be understood that alternate means, such as a special purpose computer or other suitable circuitry having logic and storage capabilities could be utilized to achieve the desired functions. In conjunction with the general purpose digital computer 30 there is provided a data base 50 which includes bulk storage such as magnetic tape memory 51, fast access storage such as disk memory 52, and random access storage such as RAM 53. Typically, at least a portion of the random access memory will be included within the general purpose computer 30, and it will be understood that the amount of each storage medium can be selected by one skilled in the art in accordance with considerations of desired processing times and cost.

A frame storage means 60 is provided and is coupled to the control circuitry 30 and also, via a D/A converter 62, to the color monitor 25. In the present embodiment, the frame storage means is of the digital type, for example the type known as a "frame buffer" manufactured and sold by Evans and Sutherland Company of Salt Lake City, Utah. Essentially, the frame buffer 60 is an addressable memory which stores a frame of video information. Each elemental area (also referred to herein as a point or "pixel") in the video frame has a stored value (referred to as a "pixel value" or "video content value") associated with it, the stored pixel value being an eight bit "word" which has a magnitude representative of the video content of the particular point. Given eight bits, there are 256 possible pixel values associated with each pixel in the frame, and this is sufficient to represent a wide range of color and brightness values, collectively referred to herein as "video content". In the present embodiment, the eight bit binary word "00000000", i.e. 0 in decimal notation, represents black level. The eight bit binary word "11111111", i.e. the number 255 in decimal notation, represents white level. In a monochrome system, the intermediate 254 pixel value possibilities could represent shadings or gradations of gray level, whereas in a color system these remaining levels represent various color possibilities. Any suitable encoding technique can be employed, a typical technique utilizing three of the bits to represent the contribution from one primary component, three of the bits to represent the contribution of another primary component, and the remaining two bits to represent the contribution of a third primary color component, the primary components being, for example, the commonly employed R, B and G color television representations of red, blue and green, respectively. The frame buffer 60 is coupled to the color monitor 25 via a D/A converter 62 which converts each digital pixel value to the appropriate R, B and G analog values for presentation on the color monitor 25. As noted, the frame buffer 60 is coupled to the control circuitry 30 via the bus 30A so that the control circuitry 30A can be utilized to address any desired pixel in the frame buffer, for example to interrogate or read the pixel value contained therein or to write in a new eight bit pixel value at any point. A video tape recording machine 55 is coupled to each of the control circuitry 30, the frame buffer 60 (via A/D converter 61), and the color monitor 25. A color television camera 65, which views a scene 66 (typically, but not necessarily, a frame of animation prepared off line), is coupled to the frame buffer 60 via A/D converter 61 and is under control of the circuitry 30. It will be understood that with this arrangement a frame of video information can be read into the frame buffer 60 from the video tape machine 55 or the color camera 65, and the contents of the frame buffer can be displayed on the color monitor 25 or read onto the video tape machine 55 for storage therein. For example, if it is desired to display the contents of the frame buffer 60 on the color monitor 25, the control circuitry 30 is caused to interrogate the frame buffer 60 in a raster scan pattern and the information therein is read out in a sequence which effects display on the color monitor 25 in a manner of conventional color television display. The same is true for transferring a frame of video information from the frame buffer to the video tape machine 55. A new frame of video information can similarly be read into the frame buffer 60, from either the video tape machine 55 or the color camera 65. A remaining important further possibility, to be described hereinbelow, is where operator-selected pixel values are read into (or out of) the frame buffer 60 directly by the control circuitry 30. For the time being, it suffices to understand that this operation is performed by interrogating a desired pixel in the frame buffer and either reading out the pixel value contained at such pixel or reading a new pixel value into the pixel. The operator 15 controls operation of the circuitry 30 via the data tablet 21 and the keyboard 22. As noted, the data tablet is conventionally provided with a data pen. This data pen includes a switch in its tip, the switch being activated when the tip is depressed, such as during writing on the tablet. When the switch is on, the coordinates at which the pen tip is located are input to the control circuitry 30. The data pen can also be utilized to input commands to the control circuitry 30 by utilizing the data pen and tablet in conjunction with the monitor 23. In particular, when a decision is to be made by the operator/animator 15, a "menu" of possible command decisions will appear on the control monitor 23. The control monitor 23 is also adapted to display a cursor dot whose position depends on the instantaneous position of the data pen on the tablet. Accordingly, when a menu is presented on the display screen 23, the operator can select a desired command word from the menu by positioning the data pen such that the cursor dot moves to a position over the desired word, and then activating the switch of the pen by depressing the pen point. It will be understood, however, that alternate means of inputting operator commands into the control circuitry 30, for example by using a light pen or other conventional means, can be utilized, or commands can be input strictly from the keyboard, if desired. The described techniques for inputting commands to a computer are all well known in the art and commercially available, and the description as set forth is intended to facilitate understanding for those not familiar with available data tablet control systems.

Figure 2:
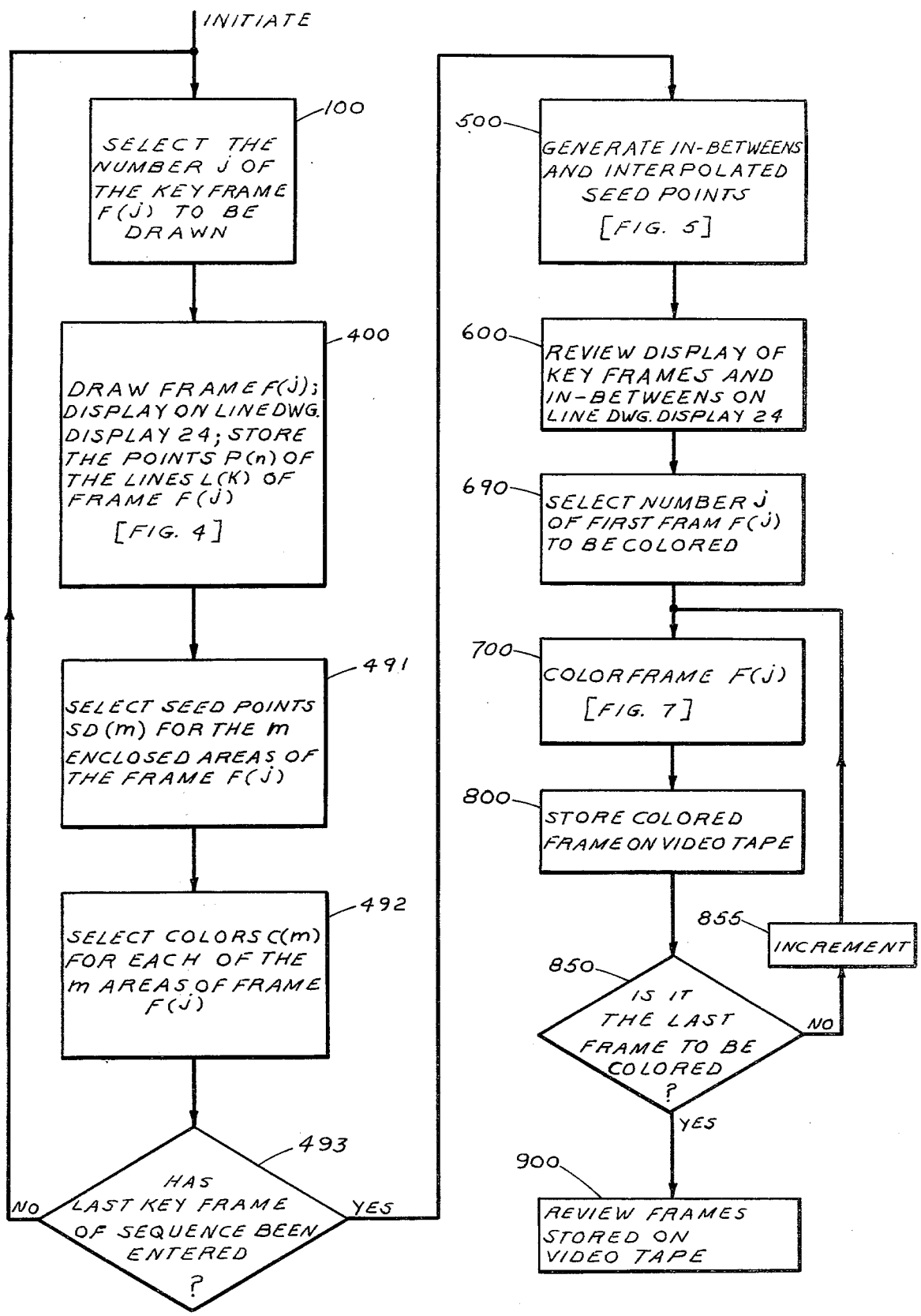
FIG. 2 is a flow diagram which, when taken in conjunction with the flow diagrams which depend therefrom, illustrate the implementation of a general purpose computer to perform functions of the control circuitry of FIG. 1 as defined by the invention.

Referring to FIG. 2, there is shown a flow diagram which, when taken in conjunction with the flow diagrams of FIGS. which depend therefrom, is suitable for implementing a general purpose computer to perform the functions of the control circuitry 30 as defined by the invention. In accordance with the present embodiment of the invention, a sequence of animated frames are generated and automatically colored, the colored frames being ultimately stored on video tape. In the present embodiment, an initial frame of a sequence, which shows the beginning extreme of some action, is drawn by the animator 15 on the data tablet 21, although it will be understood that this and other frames could be entered by alternate means, if desired. The animator will later draw and enter a subsequent frame which defines an end extreme of the action, and socalled in-between frames will be generated to fill the action between the extreme frames, referred to as "key" frames. The index j is utilized to specify frame number in the sequence.

Figure 3A:
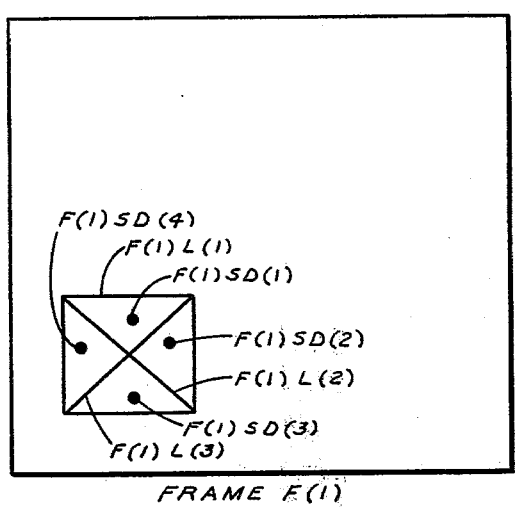
FIGS. 3A–C illustrates operation of the invention by showing animator-drawn frames and in-between frames and the technique for coloration thereof.

The animator selects the number of the key frame F(j) to be drawn, as represented by block 100 of FIG. 2. For convenience of explanation it will be assumed that the first frame of a sequence of frames F(j) to be generated has j=1, so it is designated as F(1). As the characters of the frame are drawn, the points traversed by the data pen, designated P(n), of the drawn lines, designated L(k), are stored in the data base under control of the control circuitry 30 and the characters drawn are displayed on the line drawing display monitor 24. (As used herein, the term "characters" is intended to include any configuration of lines and/or points.) These functions are represented by the block 400 of FIG. 2 and will be described in further detail hereinbelow in conjunction with FIG. 4. In the present embodiment, a line is defined by a stroke of the data pen without lifting the data pen. As will become clear, the sequence of lines in successive key frames is useful in obtaining the interpolated in-between frames, and characters to be interpolated should preferably have the same number of lines in successive key frames. FIG. 3A illustrates a character drawn by the animator 15 in key frame F(1). For ease of explanation, a simplified character drawn using three lines (as defined) is shown. The character is a square whose outline is drawn as a single line designated line F(1)L(1), and has diagonals drawn as lines designated line F(1)L(2) and line F(1)L(3).

Referring again to FIG. 2, after a frame F(j) has been drawn, the block 491 is entered and the animator is automatically requested to select seed points, designated SD(m) for the m areas of the key frame F(j). The seed points designate the distinct enclosed areas to be colored and, as will become understood, provide a position reference from which color filling is initiated in the key frames as well as the in-between frames interpolated therefrom. In the example of FIG. 3A, there are four distinct enclosed areas to be colored, these areas being designated as area 1, area 2, area 3 and area 4, and having seed points inserted therein which are designated as F(1)SD(1), F(1)SD(2), F(1)SD(3), and F(1)SD(4), respectively. The seeds can be inserted by the operator anywhere within the enclosed area. In conjunction with each seed point SD(m), the animator selects a video content value, hereinafter referred to as a color and designated as C(m) (block 492). C(m) is the pixel value which is to be assigned to every pixel within the enclosed area m. Accordingly, the color, C(m) for a given area m will be represented by an eight bit binary word which represents one of 256 possible color values. The color may be selected from an off-line chart and its value entered via the keyboard 22. A more convenient mode of operation, however, is to display a palette including a sample of all 256 possible colors, using the bottom portion of the color monitor 25. This is readily achieved by storing a small sample of all 256 possible eight bit word values in a number of adjacent points of the frame buffer (preferably in the portion thereof corresponding to the bottom lines of the display), and then calling up the palette for display on the color monitor 25 when necessary. The animator can select a particular color C(m) by moving the data pen until a cursor dot is positioned at the desired color sample of the palette and then depressing the pen tip to enter the selected color C(m) in the manner previously described with reference to the entering of commands. To reiterate, the animator enters a seed, for example seed F(1)SD(1) for area 1 of frame 1 by positioning the pen anyplace within area 1 and depressing the data pen. He then enters the color F(1) C(1) for area 1 of frame 1 by using the data pen to position the cursor dot at the selected color on the palette whereupon the data pen is again depressed.

Figure 3B:
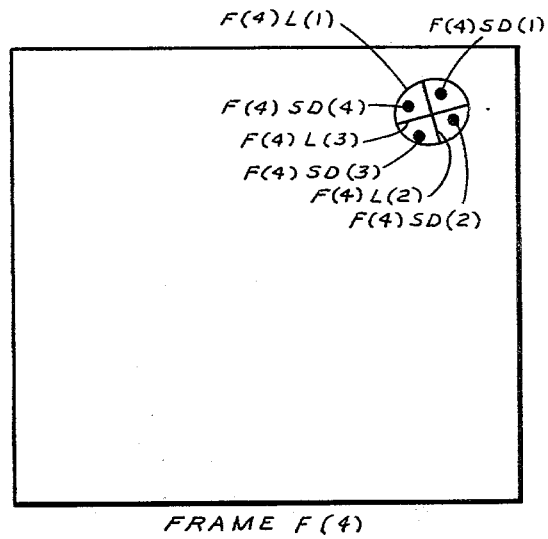

When seed points and associated colors have been entered for each area, inquiry is made as to whether the last key frame of this sequence has been entered, as represented by diamond 493. If not, block 100 is reentered and the index number of the next key frame, F(j), to be drawn is entered. The frame is then drawn in accordance with the block 400 and the points P(n) of the lines L(k) of the present frame F(j) are stored and the line drawing presented on the line drawing display 24, as previously described. (It will be understood that, if desired, subsequent frames can be generated before any seed points are inserted or any colors selected, depending on the choice of the animator. In such case, earlier drawn key frames would be recalled later for insertion of seeds.) FIG. 3B shows an example of a character drawn for the end extreme key frame which, for the present illustrative example, is designated as being frame number F(4). Accordingly, for this example, the animator selected the value j=4 before the key frame was drawn. In the case of key frame F(4), the line F(4)L(1) is a circle and the lines F(4)L(2) and F(4)L(3) are perpendicularly intersecting diameters. Again, there are four areas designated by the reference numerals 1 through 4. The blocks 491 and 492 are then entered and the seeds for the areas of F(4) (designated F(4)SD(1), F(4)SD(2) . . . etc.) as well as their associated colors (designated F(4)C(1), F(4)C(2) . . . etc.) are entered by the animator, preferably in the sequence previously described.

Figure 3C:
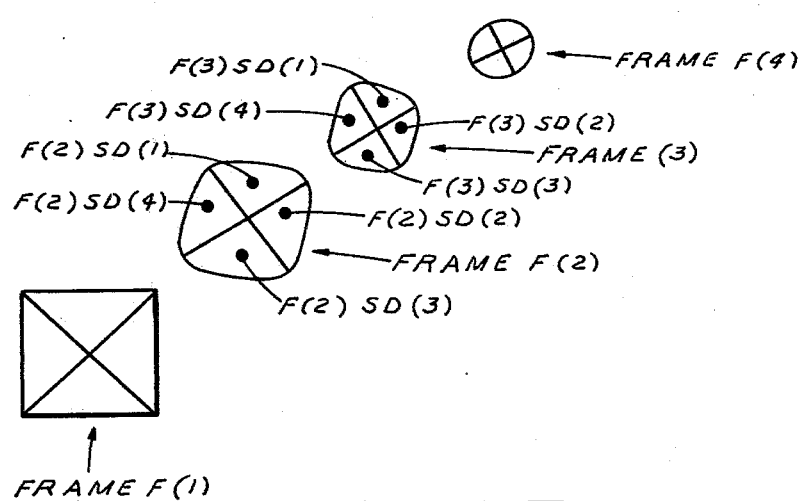

Having generated the frame F(4), inquiry is again made as to whether the last key frame has been entered (diamond 493), and since the answer is "no", the block 500 is entered. Block 500 represents the generation of in-between frames and the interpolation of the seed points SD(m). These functions are described in detail in conjunction with FIG. 5. However, to understand the overall operation, reference is made to FIG. 3C which illustrates the action sequence resulting from a superposition of the two key frames F(1) and F(4) as well as in-between frames designated F(2) and F(3) which were generated in accordance with functions of the block 500. As will be described further hereinbelow, the in-between frames are obtained by interpolating from the key frames in accordance with parameters selected by the animator. In accordance with the principles of the invention, the seed points SD(m) for each enclosed area are interpolated and, as a result, each seed point remains within its associated enclosed area for the in-between frames. In FIG. 3C, the in-between frames F(2) and F(3) each has four enclosed areas with corresponding seed points designated SD(1) through SD(4).

After the in-betweens and interpolated seed points have been generated, a "review" display of the action frame sequence is presented on the line drawing display 24 (in monochrome), this function being represented by the block 600. If the action sequence, including the in-between frames, is deemed satisfactory, coloration of the enclosed areas is initiated by setting the index j to the number of the first frame to be colored (block 690 of FIG. 2), for example frame F(1) for the illustrated example. The selected frame F(j) is then automatically colored, as represented by the block 700, and described in detail in conjunction with FIG. 7. Briefly, coloration of each enclosed area is implemented by starting at a seed point and scanning each point within the boundary of the enclosed area. As this scan is performed, the color value C(m) associated with the particular enclosed area is assigned to each point within the area, the assigned value being entered in the frame buffer 60. The described technique is performed for each enclosed area of the frame being colored. When all enclosed areas have been colored, the frame is stored on video tape by transferring the contents of the frame buffer 60 to the video tape machine 55, in the manner previously described, and as is represented by the block 800. Inquiry is next made as to whether the frame just colored was the last frame to be colored in the action sequence. If not, the index j is incremented (block 855) and the next frame (frame F(2) in the illustrated example) is automatically colored and stored on video tape as represented by the blocks 700 and 800. When all the frames of the action sequence have been colored, the frames now stored on video tape can be reviewed by the animator, as indicated by the block 900.

Figure 4:
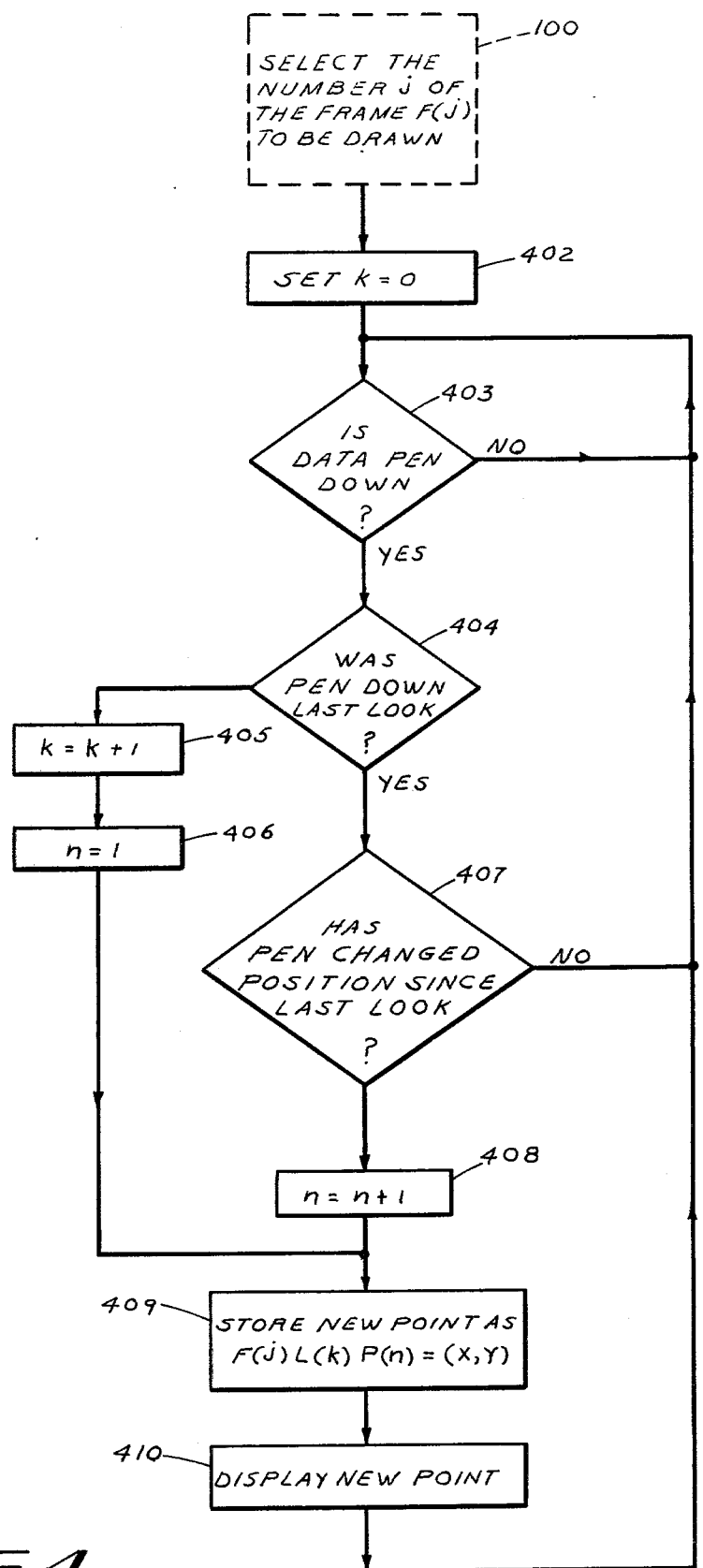
FIG. 4 is a flow diagram suitable for implementing the line drawing storage and display functions represented by the block 400 of FIG. 2.

Referring to FIG. 4, there is shown a flow diagram which details the functions previously described in conjunction with the block 400 of FIG. 2. In accordance with this routine, and as previously described in general terms, the coordinate points input by the animator via the data tablet 21 are stored and displayed. As noted, a series of points drawn continuously on the tablet with the data pen "down" are considered as a line, and lines as well as points are kept track of, the lines being useful in implementing subsequently described operations. The points of each line for a given frame are described by the notation F(j)L(k)P(n), where j is the frame number of frame F(j), k is the line number of line L(k) and n is the point number of the point P(n). Each so-defined point has a memory location associated with it in the data base 50, and the (x,y) coordinate of the point is stored at the particular memory location. The index number j of the frame being drawn was selected in accordance with block 100 of FIG. 2 (shown also in dashed line in FIG. 4). The index k is initially set to zero before the first line is drawn, as indicated by the block 402. Inquiry is made as to whether or not the data pen is "down" (diamond 403). If not, inquiry is again made after a given cycle time, as indicated by the loop back to the input of diamond 403. If the data pen is down, inquiry is made as to whether the data pen was down during the last look; i.e. the last cycle. The time period of the cycle depends on the basic cycle time of the particular control circuitry or computer being utilized. If the data pen was not drawn during the previous look, it means that a new line is being drawn and the index k is incremented (block 405). Also, since it is the first time that the pen has been sensed as being down, the first point of a new line is indicated, so the index n is set equal to 1, as represented by the block 406. The (x,y) coordinates of the data pen tip are stored at the memory location designated F(j)L(k)P(n), as represented by the block 409. The newly stored coordinate point is also displayed on the line drawing display monitor 24, as represented by the block 410. The decision diamond 403 is then reentered for the next cycle. If the answer to the inquiry of diamond 404 has been "yes" (i.e., the pen was down at the previous look), then inquiry is made as to whether the pen has changed position since the last look (diamond 407). In other words, it is determined whether the pen has moved sufficiently since the last cycle to be considered, within the resolution of the data tablet coordinate system, to be at a new (x,y) coordinate. If not, diamond 403 is reentered for the next cycle. If a new coordinate point is sensed, however, the index n is incremented, indicating a new point, and blocks 409 and 410 are successively entered for storage and display, respectively, of the new point. The routine continues until terminated by the animator indicating that the current frame is completed.

Figure 5A:
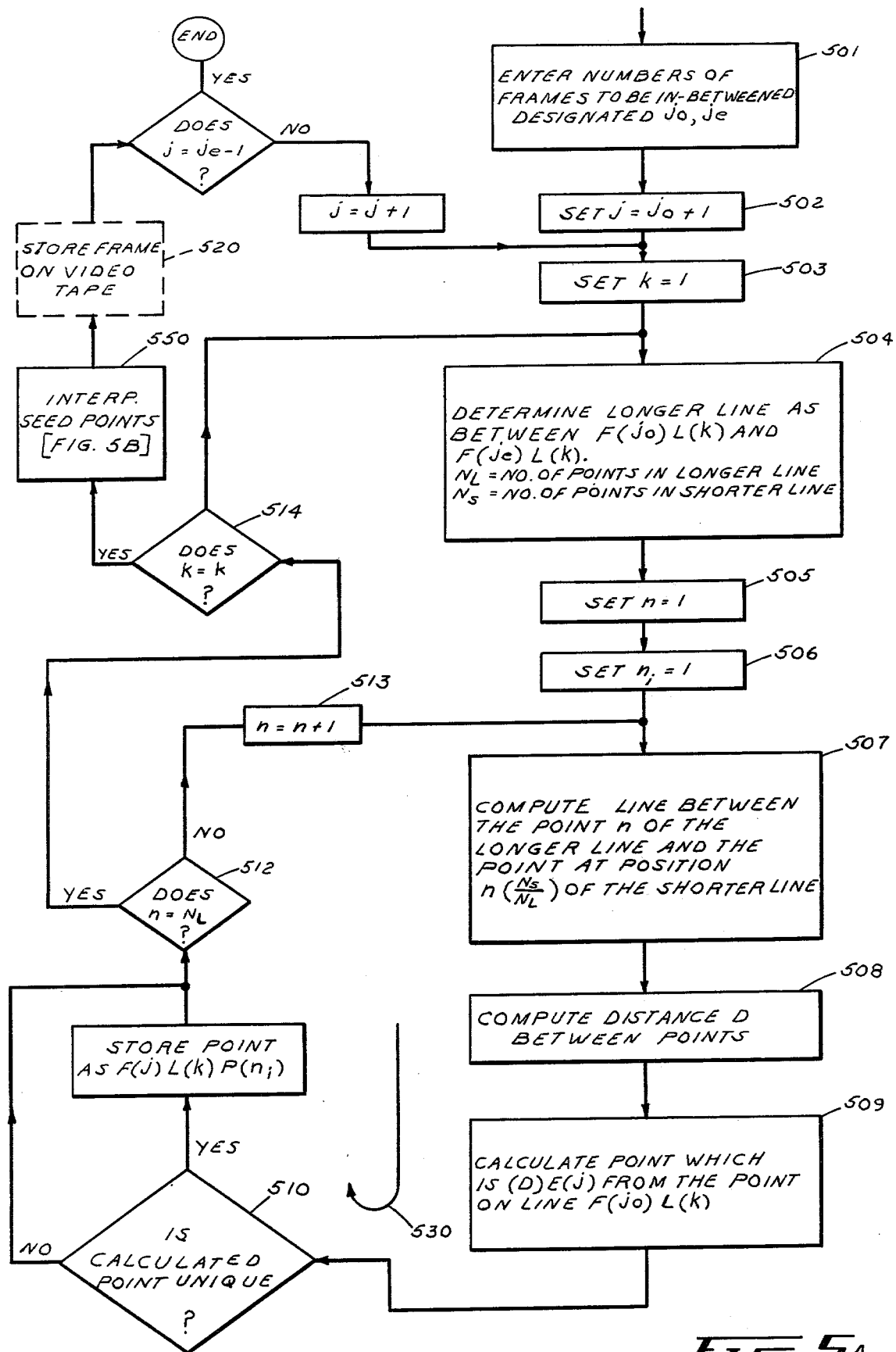
FIG. 5A and FIG. 5B are flow diagrams suitable for implementing generation of in-between line drawings and interpolated seed points, as generally represented by the block 500 of FIG. 2.

Referring to FIG. 5, there is shown a flow diagram which details a routine suitable for implementing the functions of the block 500 of FIG. 2. Examples of in-between frames are the frames F(2) and F(3) shown in the illustrative example of FIG. 3. In the present embodiment, in-betweening is generally performed by interpolating between points on corresponding lines of two key frames, such as the frames F(1) and F(4) of FIG. 3. The number of in-between frames is determined by the selected index numbers of the key frames so that, for example, by selecting the key frames as being frames F(1) and F(4), the operator is indicating that there will be two in-between frames. Corresponding lines of successive key frames are determined by the order in which they are drawn. In the present embodiment, the operator has flexibility to determine the "rate" at which the character (or characters) of the first key frame changes to the character of the last key frame. This is done by apportioning the interpolation position as between corresponding points (on corresponding lines) of the two key frames. For example, in the case of a linear interpolation, the interpolated in-between frames will have their lines at equally spaced positions between the corresponding lines of the key frames. This is the case in the illustration of FIG. 3 where it is seen that the in-between frames are evenly spaced between the two key frames and the nature of the in-betweens varies at a uniform rate as between the characters of the key frames. It may be desired, however, in some cases to have the in-betweens change at a non-uniform rate and retain the nature of a character of one of the key frames for a relatively longer period before it changes to the corresponding character of the later key frame. This is achieved by varying the interpolation in accordance with operator-selected input parameters.

Figure 8A:
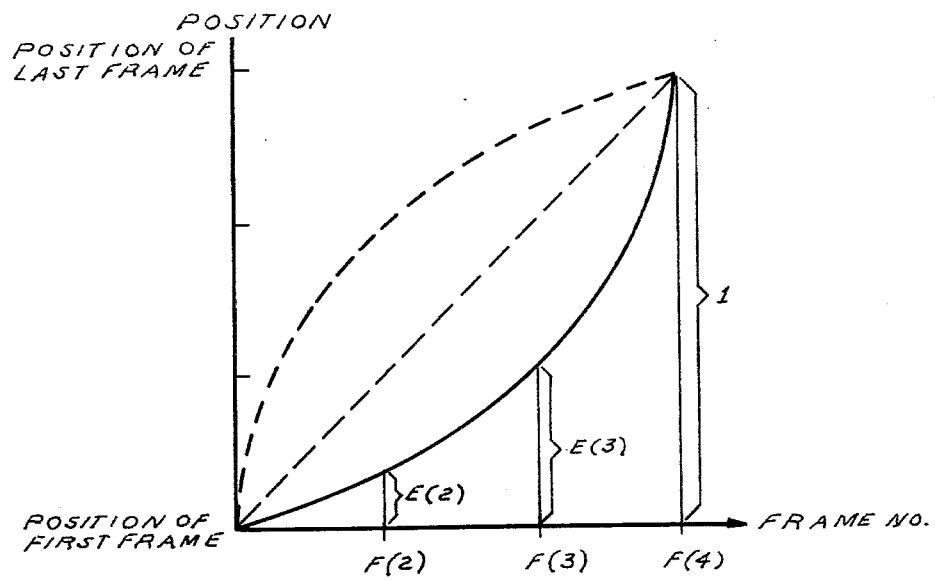
FIG. 8A is a graph of operator-selected character positions.

In FIG. 8A there is shown a graph of character position versus frame number. The dashed straight line is representative of a linear interpolation, whereas the solid line represents an operator-specified interpolation instruction which directs that the character retain the nature of the first key frame for a relatively longer time. Full scale on the vertical (ordinate) axis is considered to have the value unity. Reference positions representative of the intermediate frame positions are located at equal distances along the horizontal axis. For example, if two in-between frames are to be generated, their reference positions on the graph of FIG. 8A will be one-third and two-thirds of the way, respectively, between the reference positions of the first and last frames. The relative height at these reference positions, generally denoted E(j) and represented by the line segments E(2) and E(3) in the FIG., determines the fractional position for the lines of the in-between frames as between the two key frames. Thus, for example, the solid line curve of FIG. 8A dictates that the first in-between frame be approximately one-eighth of the total distance as between the two key frames (E(2)=0.125) and the relative position of the second in-between frame is about one-third the distance between the two key frames (E(3)=0.33). These numbers can be compared against the relative fractional distances of one-third and two-thirds, respectively, which would be the case for a linear interpolation. The dashed curved line represents the opposite situation where E(2)=0.66 and E(3)=0.875 and the character takes on the nature of the last key frame at a faster rate. The manner in which the interpolation is achieved will be described further, but it should be understood at the outset that the operator can select the rate of change of the in-betweens either by appropriate specification using a curve (which may be input, for example, using the data pen), by inputting the fractional specifications E(j) using the keyboard or by any other suitable technique. For understanding the routine itself, it is also helpful to initially recognize that it is generally necessary to interpolate as between lines having different numbers of points. As will become clear, this is done in the present embodiment by calculating the position of "secondary" points on the shorter of the two lines and using these points to implement the interpolation.

Figure 8B:
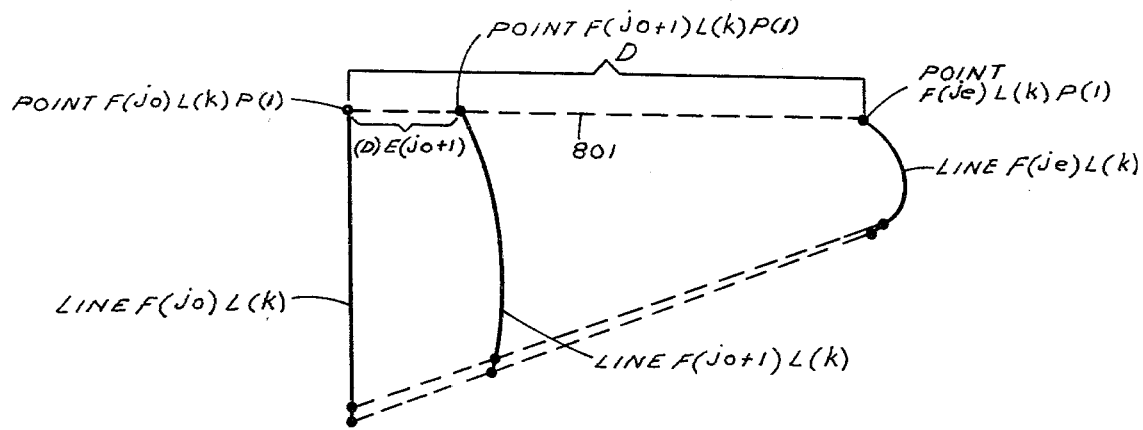
FIG. 8B illustrates an example of frame interpolation and is useful in understanding the operation of FIG. 5.

With reference to FIG. 5, the numbers of the key frames to be in-betweened, designated $j_o$ and $j_e$, for the first and last frames respectively, are entered (block 501). The frame number index, j, is incremented (block 502) to yield, in the first instance, the frame number of the first in-between frame; viz. $j_o+1$. The line number index is initially set to 1, as represented by the block 503. The first lines in each of these key frames is next examined, by examining the number of points in each of the lines, and determination is made as to which line is longer, as represented by the block 504. Refer to FIG. 8B for illustration wherein an example is shown with the first line of a first key frame, designated $F(j_o)L(k)$, being longer than the first line of a last key frame, this line being designated by $F(j_e)L(k)$. The point index, n, is initially set to unity, as is a secondary point index, designated $n_i$, these functions being represented by the blocks 505 and 506, respectively. The number of points in the longer line is designated $N_L$, and the number of points in the shorter line is designated $N_S$. Accordingly, to obtain a point on the shorter line which corresponds to a point n on the longer line, the calculated position of the point on the shorter line is a position corresponding to $n(N_S/N_L)$. The line between the point n of the longer line and the point at the position $n(N_S/N_L)$ of the shorter line is computed, this line being the dashed line 801 of FIG. 8B. The length of this line is called D, this length being calculated from the coordinates of its end points using the Pythagorean Theorem (block 508). The location of the first point of the first in-between can then be obtained by calculating the position of the point which is a distance (D)E(j) from the point on line $F(j_o)L(k)$. In other words, the fractional distance along the line D is the operator-selected distance for the location of the first in-between frame, as determined, for example, from the value E(2) of the operator-drawn curve of FIG. 8A. The location of the point, designated as F(j)L(k)p(n) (see FIG. 8B) is calculated, using the following algebraic relationship:

$$x_n = E(j)/D(y_e - y_o) + y_o$$

$$y_n = E(j)/D(x_e - x_o) + x_o$$

where $(x_n, y_n)$ are the coordinates of the point being calculated, $(x_o, y_o)$ are the coordinates of the point in frame $F(j_o)$ and $(x_e, y_e)$ are the coordinates of the point in frame $F(j_e)$. The new point of the in-between frame is then examined to see if it corresponds to an already existing point on the particular line of the in-between being generated. (This check is made since, within the resolution of the coordinate system being utilized, the particular line of the in-between being generated may have many less points than $N_L$, and when two points are found within the same elemental area, only one of them is stored.) Accordingly, if the newly calculated point is found to be at a unique location, it is stored as the point F(j)L(k)p(n), as represented by the block 511 of FIG. 5. The index n is then tested (diamond 512) to determine if it equals $N_L$, the last point on the longer line. If not, the index n is incremented (block 513) and the loop 530 is reentered for calculation of and storage of the remaining points on the first line of the first in-between frame, represented in FIG. 8B as the line $F(j_o+1)L(k)$. When the index n is found to equal $N_L$, the decision diamond 514 is entered and the line number, k, is tested to see whether it equals the maximum number of lines in the key frames, designated K. If not, the index k is incremented (block 515) and the block 504 is reentered for processing of the next line of the in-between. If k does equal K, the in-between frame (i.e., a line drawing thereof) has been completed and block 550 is entered for interpolation of the seed points, described in conjunction with FIG. 5B. When this is complete, the frame can be transferred into bulk storage, as represented by the block 520, shown in dashed line. The index j is then tested (diamond 516) to determine whether it equals $j_e - 1$ (diamond 516); i.e., the last in-between frame to be generated. If so, the routine is over. If not, the index j is incremented (block 517) and the block 503 is reentered to begin generation of the next in-between frame.

Figure 5B:
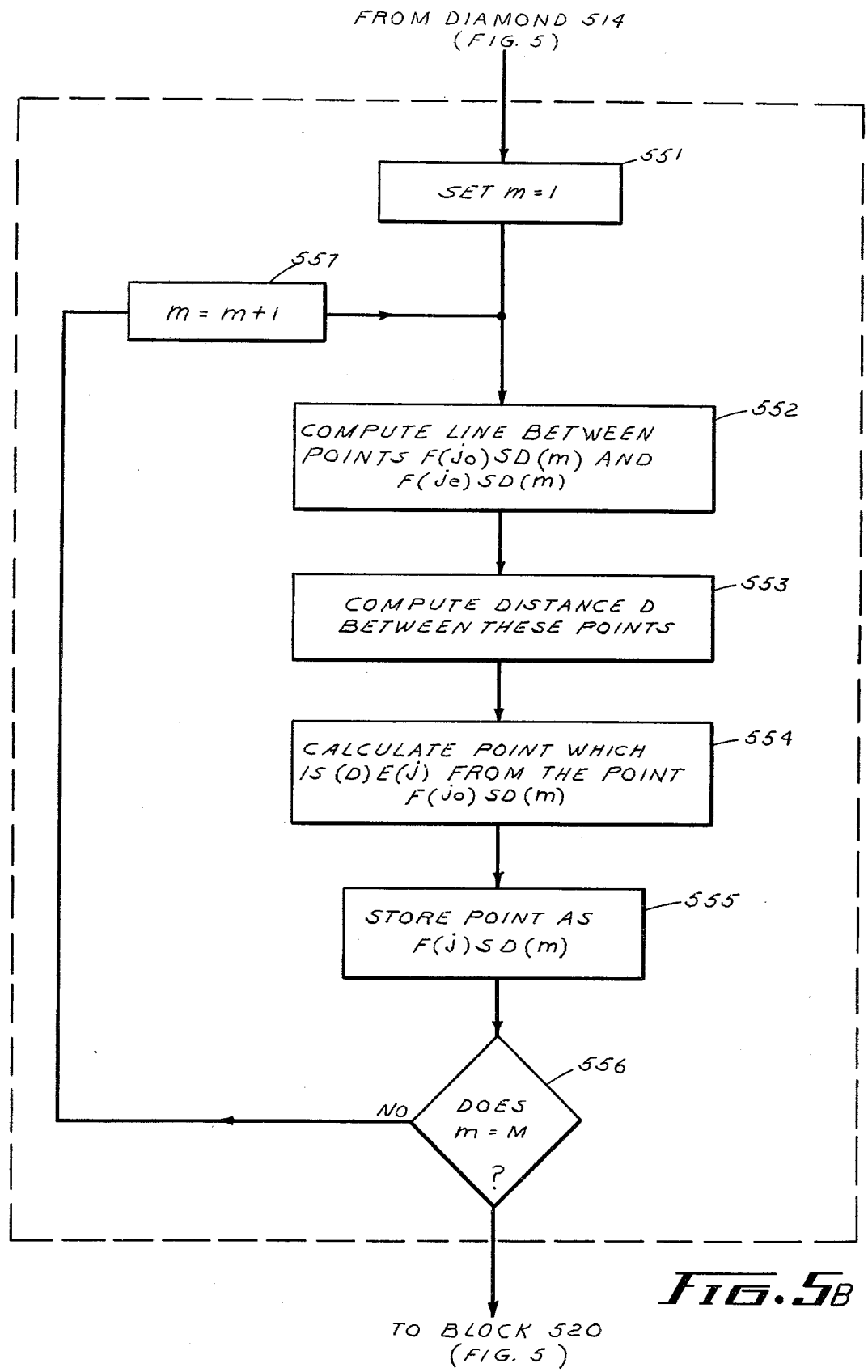

Referring to FIG. 5B, there is shown a flow diagram for implementing the functions set forth in the block 550 of FIG. 5; i.e. interpolation of the seed points for the various enclosed areas of the in-between frames. The enclosed area index, m, is initially set to unity, as represented by block 551. The line between the points $F(j_o)SD(m)$ and the point $F(j_e)SD(m)$ is then computed (block 552), and the distance D between these points is also computed (block 553). Next, the location of the interpolated seed point for the enclosed area m is obtained by calculating the position of the point which is a distance (D)E(j) from the seed point of the area m of the first key frame, $F(j_o)SD(m)$ (block 554). The coordinates of the calculated point are stored as the interpolated seed point m of the frame j; viz., F(j)SD(m), as represented by the block 555. It is seen that this interpolation of seed points utilizes the same technique as was used to interpolate the line drawings, as represented by the blocks 504-513 of FIG. 5 and as shown diagrammatically in FIG. 8B. The index m is tested (diamond 556) to determine whether it equals the number of the last enclosed area, M. If not, the index m is incremented (block 557), and the interpolated seed point for the next enclosed area of the particular in-between frame j is generated. When m is found to equal M, the block 520 of FIG. 5 is entered.

Referring to FIG. 7, there is shown a flow diagram for implementing the functions shown generally in the block 700 of FIG. 2. In accordance with the flow diagram of FIG. 7, the control circuitry 35 (FIG. 1) causes the coloration or shading of each frame in the sequence by starting at the seed points for each enclosed area m thereof and "filling" the enclosed area. This is done by inserting the appropriate operator-selected color, C(m) at all points of the enclosed area. In scanning the enclosed area during the filling operation, it is desirable that all possible configurations of enclosed areas, including those with "lobes" (to be described) be automatically filled. In the present embodiment, this is achieved by starting at the original seed point, SD(m), for a given area and filling the corresponding points in the frame buffer along a horizontal scanline containing the original seed point. The lines above and below the line just filled, designated the "main line", are then examined for the presence of a specified boundary condition (to be described). When the condition is met, a "working seed" is indicated as being present at the particular boundary. The horizontal line which contains each working seed is then filled, in a manner to be described, and subsequent working seeds are generated by examining the horizontal scanlines above and below the main line just filled.

To facilitate description of the technique, a working example is shown in FIG. 6 which shall be referred to in conjunction with the flow diagram of FIG. 7. In FIG. 6, an enclosed area to be filled, designated 601, has a number of lobes referred to by reference numerals 611, 612, 613 and 614. For ease of illustration, and to better understand the boundary conditions, the enclosed area is shown as having a periphery consisting of straight lines, although it will become understood that the described routine causes the filling of any enclosed area regardless of shape. Assume that the original seed point for a given enclosed area m of a given frame j, and designated F(j)SD(m), is at the location as shown in FIG. 6A; viz., near the top of the lobe 611. With reference to FIG. 7, the index number of the first frame to be filled, j, is entered, as represented by the block 701, and the line drawing of the frame is entered into the frame buffer under control of the control circuitry 35. As previously noted, black level in the frame buffer is denoted by the value "00000000" for the eight bit word which defines a pixel value, and white level is denoted by the eight bit word "11111111". When the line drawing is entered into the frame buffer, the coordinate points thereof are set at white level, so if the contents of the frame buffer were displayed, at this time, a white line drawing would appear on a black background. The index m is set to 1, designating the first enclosed area to be filled, as represented by the block 730. The seed point F(j)SD(m) is placed on a list of "working seeds", a concept that will be better understood shortly. At this time, the seed F(j)SD(m) is the only seed on the list. Inquiry is made as to whether the list of working seeds is exhausted, as represented by diamond 704. If not, the block 705 is entered and the working seed at the end of the list is used as a start point for filling a horizontal scanline in the frame buffer with the operator-selected color C(m). Filling is done left and right on the horizontal scanline until a boundary is reached, a boundary being considered any point which has a pixel value other than "00000000" (black level). Accordingly, it will be understood, that any point of a line of the line drawing or any point which has already been filled is considered "out-of-bounds", and all other points are considered as being "in-bounds". In FIG. 6A, the line 620 represents the horizontal line which was filled, left and right to the boundaries, with the color C(m), this line being considered the "main line". The points (or pixels) above and below the main line are next examined as follows: An "above/below" index is first set to "above", as represented by the block 706. Examination begins at the left end of the main line, as represented by the block 707. The pixel directly above (since the above/below index is set to "above") the current pixel of the main line (the current pixel of the main line presently being the leftmost pixel thereof—block 707) is examined, as represented by the block 708. Inquiry is made as to whether the pixel is in bounds, as represented by the diamond 709. If so, the block 710 is entered which indicates the advance to the right on the main line of the current pixel and the subsequent examination of the pixel above the current pixel (block 711). Inquiry is again made as to whether the pixel being examined is in-bounds, as represented by diamond 712. If so, the block 710 is reentered and the procedure continues via the loop 715 until a boundary is hit. In terms of the example of FIG. 6A, this continued examination would bring one from left to right along the dotted line above the main line 620. When a boundary is reached, the answer to the inquiry of diamond 712 is "no" and the block 716 is entered, this block directing that the previous "above" pixel be put on the end of the list of working seeds. In other words, the last in-bounds pixel, represented by the asterisk 602 in FIG. 6A, is put on the end of the list of working seeds. Note that it is presently the only working seed on the list since the original seed point is already being processed. Inquiry is next made (diamond 718) as to whether the current point on the main line has extended beyond the right end of the main line. If not, the block 708 is reentered. In the situation of FIG. 6A, the answer to the inquiry of diamond 718 would be "yes". (The situation where the current point on the main line has not passed the right end of the main line will be treated hereinbelow.) If the answer to the inquiry of the diamond 718 is "yes", the diamond 721 is entered and inquiry is made as to whether the above/below index (which is initially set to "above" by block 706) is at "below". If not, the above/below index is set to "below", as represented by the block 722. The block 707 is then reentered and the same processing described before is repeated, except that the pixels below (instead of above) the main line are examined in sequence. This results in examination of the pixels depicted by the dotted line directly below the main line 620 in FIG. 6A and also results in a seed designated by asterisk 603 in the FIG. 6A.

Figure 6A:
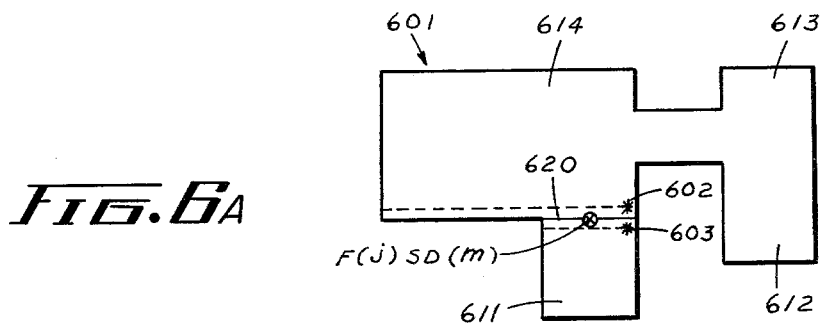
FIG. 6, which consists of FIGS. 6A–6G, is a series of diagrams which illustrate the color filling technique and is helpful in understanding the routine of FIG. 7.
Figure 6B:
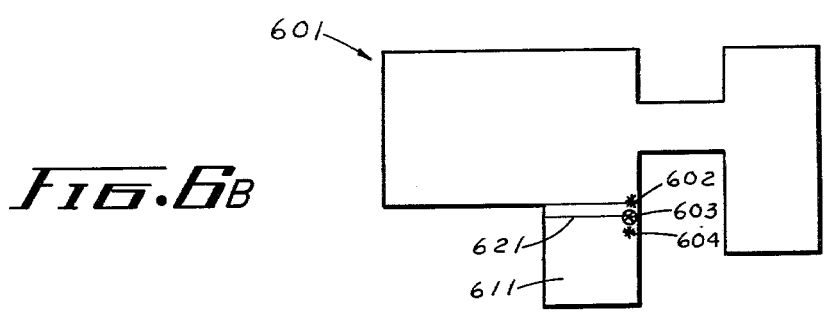
Figure 6C:
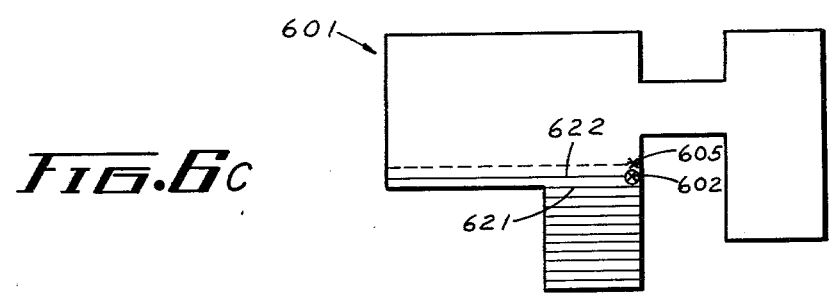
Figure 6D:
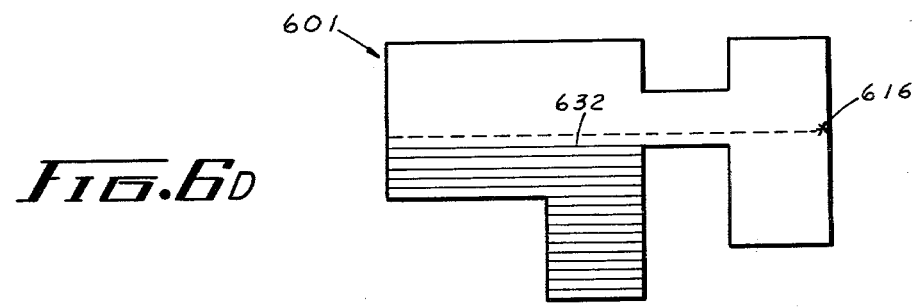
Figure 6E:
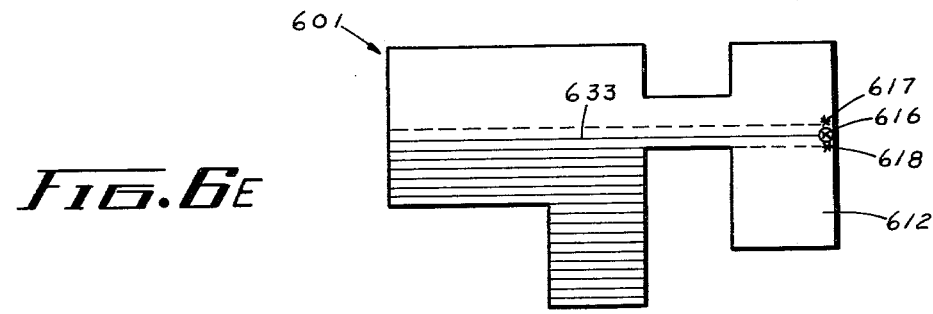
Figures 6F, 6G:
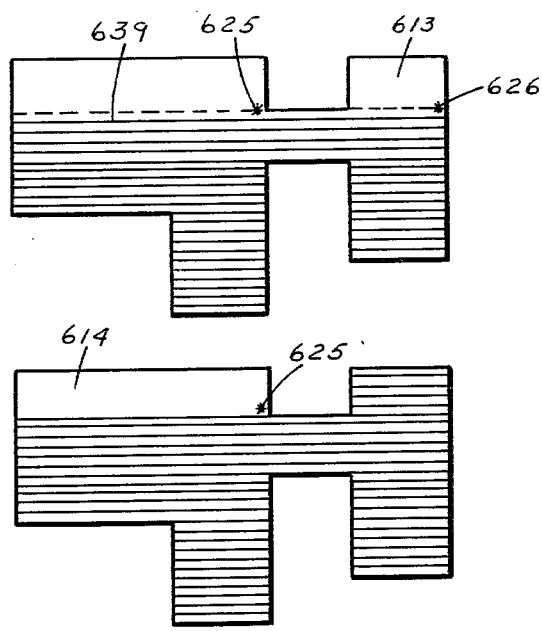

After the described processing, when the diamond 721 is now entered, the answer thereto will be "yes" and the diamond 704 will then be reentered. The list of working seeds now has the seeds 602 and 603 thereon, so the block 705 is entered and the last seed on the list (603) is considered and filled left and right to the boundary with the color C(m), this filled line being the new "main line" and being shown in the FIG. 6B as line 621. The working seed being considered (603 in this case) is circled in this FIG., as it is in the other portions of FIG. 6. The examination of the lines above and below the new main line 621 will now proceed as before. It will be recognized that when the above/below index is next set to "above", no pixels above the new main line 621 will be found to be in bounds, since the line above line 621, i.e. line 620, has already been filled and is considered as being out-of-bounds. Accordingly, during the "above" processing, the answer to the inquiry of diamond 709 will always be "no" and no working seed will result from the examination of pixels above the main line 621 (since block 716 will not be entered). However, when the above/below index is eventually changed to "below", the examination of the pixels below the main line 621 will eventually result in the generation of a new working seed designated by reference numeral 604, as shown in FIG. 6B. The remainder of the lobe 611 will be filled with the color C(m) in this manner, and when the bottom line of the lobe is filled, no further working seeds will be generated thereunder since no more in-bounds pixels will be found. Thus, when the block 705 is eventually reentered, the working seed 602 will be the only seed on the list. This will result in the filling of a line labeled 622, as shown in FIG. 6C and, subsequently, in the generation of a new working seed labeled 605. The filling of lines upward will then proceed in the manner described until the line labeled 632 (FIG. 6D) becomes the main line. This will result in the generation of the working seed labeled 616 (FIG. 6D) which will, in turn, result in the filling of the line 633 and the generation of the working seeds 617 and 618 above and below the main line 633 (as shown in FIG. 6E). Now, we have a situation similar to that of FIG. 6A, and this will result in the lobe 612 being filled in the manner previously described. After filling of the lobe 612, filling above the line 633 will proceed in the manner described in conjunction with FIG. 6C, until the line 639 becomes the main line (FIG. 6F). When examining the pixels above the line 639, it is seen how operation of the diamond 718 of FIG. 7 comes into play. The working seed 625 will be generated during the left to right examination of pixels above the line 639. However, in this case, when inquiry is made as to whether the current pixel on the main line has extended beyond the right of the main line (diamond 718), the answer will be "no" since the current point on the main line has not yet reached the rightmost edge of the line 639. Accordingly, the block 708 will be reentered and the looping will continue until the working seed 626 is eventually generated, as shown in FIG. 6F.

Subsequently, the lobes 613 and 614 will be filled, in a manner similar to that previously described, and as illustrated in part in FIG. 6G. After the filling is complete, inquiry of diamond 704 will yield a "no" answer and the diamond 735 will be entered to determine if any areas m remain to be filled, or if m has reached the last area, designated M. If not, the index m will be incremented, as represented by the block 736 and the block 703 will be reentered for filling of the next area. When the index m reaches M, the frame will have been completely filled with the operator-selected video content values or colors C(m).

The invention has been described with reference to a particular preferred embodiment, but variations within the spirit and scope of the invention will occur to those skilled in the art. For example, while the outlines to be colored have been shown as being entered from a data tablet, it will be understood that they could be entered by other suitable means, such as via the camera 65. Coloration or shading with a single color or shading level has been shown for purposes of illustration, but it will be understood that a preselected pattern could be readily employed in substitution for a single color or shading. Further, it will be understood that coloration or shading of a background (i.e. outside one or more enclosed areas) is achieved by inserting an operator-selected seed in the background area in conjunction with a desired video content value. Further, it will be understood that alternate techniques for storing the coordinates of lines defining a closed area could be employed, for example by storing end points of straight line segments and approximating curved lines with short straight line segments. It should also be noted that while the described order of generating in-betweens and then effecting the desired coloration or shading is preferred, an operator can readily perform the operations in any desired order, such as by commanding coloration as soon as an outline drawing is entered. Finally, it will be recognized that the "frames" generated in accordance with the present description can be combined or superimposed to form higher level frames, and the use of the term "frame" is intended in a non-limiting sense to mean any frame or field of video information or unit portion of an image.

We claim:

1. Apparatus for automatic coloration and/or shading of images, comprising:
   display means;
   graphical input means having a coordinate system adapted to effect display on said display means characters defined by coordinate points selected by an operator;
   means for storing coordinate points defining at least one enclosed area of said coordinate system;
   means for storing an operator-selected position reference which identifies each enclosed area;
   means for storing an operator-selected video content parameter associated with each of said position references;
   means for scanning the coordinate points within each enclosed area, the scan for each area initiating from a position which depends upon its associated stored position reference; and
   video frame storage means for storing the selected video content parameter for each of the scanned coordinate points within each enclosed area.

2. Apparatus as defined by claim 1 further comprising bulk video storage means for storing the contents of said video frame storage means.

3. Apparatus as defined by claim 1 further comprising:
   means for automatically generating and storing a plurality of frames wherein said at least one enclosed area assumes a different relative location or shape in said coordinate system;
   means for automatically modifying each of said position references in accordance with the changes in its associated enclosed area;
   means for scanning, for each frame, the coordinate points within each enclosed area, the scan for each area initiating from a position which depends upon the modified position references;
   whereby said frame storage means, for each frame, stores the selected video content parameter for each of the scanned coordinate points within each enclosed area.

4. Apparatus as defined by claim 1 wherein said video content parameter is a color-defining parameter.

5. Apparatus as defined by claim 4 further comprising:
   means for automatically generating and storing a plurality of frames wherein said at least one enclosed area assumes a different relative location or shape in said coordinate system;
   means for automatically modifying each of said position references in accordance with the changes in its associated enclosed area;
   means for scanning, for each frame, the coordinate points within each enclosed area, the scan for each area initiating from a position which depends upon the modified position references;
   whereby said frame storage means, for each frame, stores the selected video content parameter for each of the scanned coordinate points within each enclosed area.

6. Apparatus as defined by claim 4 wherein said display means further comprises a color display for displaying the contents of said video frame storage means.

7. Apparatus as defined by claim 5 wherein said display means further comprises a color display for displaying the contents of said video frame storage means.

8. Apparatus for automatic coloration of images, comprising:
   display means;
   graphical input means having a coordinate system adapted to effect display on said display means of coordinate points selected by an operator;
   means for storing the coordinate points of lines defining a plurality of enclosed areas of said coordinate system;
   means for storing operator-selected position references which identify each enclosed area;
   means for storing an operator-selected color-defining parameter associated with each of said position references;
   means for scanning the coordinate points within each enclosed area, the scan for each area initiating from a position which depends upon the stored position references; and
   video frame storage means for storing the selected color-defining parameter for each of the scanned coordinate points within each enclosed area.

9. Apparatus as defined by claim 8 further comprising:

means for generating and storing a plurality of key frames, each of said key frames having a plurality of enclosed areas;

means for automatically generating and storing at least one in-between frame wherein said plurality of enclosed areas assume relative locations and shapes which are interpolated from their relative locations and shapes in said key frames;

means for automatically generating position references for the enclosed areas of said at least one in-between frame, said position references for said in-between frame being interpolated from the position references of said key frames;

means for scanning, for said at least one in-between frame, the coordinate points within each enclosed area thereof, the scan for each area of said at least one in-between frame initiating from the interpolated position references; whereby said frame storage means, for each frame, stores the operator-selected color-defining parameter for each of the scanned coordinate points within each enclosed area of each frame.

10. Apparatus as defined by claim 8 further comprising bulk video storage means for storing the contents of said video frame storage means.

11. Apparatus as defined by claim 10 further comprising:

means for generating and storing a plurality of key frames, each of said key frames having a plurality of enclosed areas;

means for automatically generating and storing at least one in-between frame wherein said plurality of enclosed areas assume relative locations and shapes which are interpolated from their relative locations and shapes in said key frames;

means for automatically generating position references for the enclosed areas of said at least one in-between frame, said position references for said in-between frame being interpolated from the position references of said key frames;

means for scanning, for said at least one in-between frame, the coordinate points within each enclosed area thereof, the scan for each area of said at least one in-between frame initiating from the interpolated position references; whereby said frame storage means, for each frame, stores the operator-selected color-defining parameter for each of the scanned coordinate points within each enclosed area of each frame.

12. A method for automatic coloration and/or shading of images, comprising the steps of:

storing the coordinate points of lines defining a plurality of enclosed areas of a coordinate system;

displaying the stored lines;

storing an operator-selected position reference which identifies each enclosed area;

storing an operator-selected video content parameter associated with each of the position references;

scanning the coordinate points within each enclosed area, the scan for each area initiating from a position which depends upon the stored position references;

storing the selected video content parameter for each of the scanned coordinate points within each enclosed area; and displaying a colored and/or shaded image from the stored video content parameters.

* * * * *